US010190633B2

(12) United States Patent
Hiramatsu

(10) Patent No.: US 10,190,633 B2
(45) Date of Patent: Jan. 29, 2019

(54) ROLLING BEARING

(71) Applicant: NTN CORPORATION, Osaka (JP)

(72) Inventor: Kengo Hiramatsu, Mie (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 15/553,151

(22) PCT Filed: Feb. 12, 2016

(86) PCT No.: PCT/JP2016/054053
§ 371 (c)(1),
(2) Date: Aug. 23, 2017

(87) PCT Pub. No.: WO2016/136483
PCT Pub. Date: Sep. 1, 2016

(65) Prior Publication Data
US 2018/0106294 A1 Apr. 19, 2018

(30) Foreign Application Priority Data

Feb. 23, 2015 (JP) .................................. 2015-033255

(51) Int. Cl.
F16C 33/62 (2006.01)
F16C 33/64 (2006.01)
(Continued)

(52) U.S. Cl.
CPC ................ F16C 33/62 (2013.01); C23C 4/08 (2013.01); C23C 4/18 (2013.01); F16C 19/02 (2013.01);
(Continued)

(58) Field of Classification Search
CPC ... F16C 33/62; F16C 2223/30; F16C 2360/31
See application file for complete search history.

(56) References Cited

U.S. PATENT DOCUMENTS

RE35,860 E * 7/1998 Ward ..................... F16C 33/32
384/492
2014/0177990 A1 6/2014 Suzuki

FOREIGN PATENT DOCUMENTS

CN 103765025 A 4/2014
EP 2749781 A1 7/2014
(Continued)

OTHER PUBLICATIONS

Machine Translation of JP 2004-300509.*
(Continued)

Primary Examiner — Thomas R Hannon
(74) Attorney, Agent, or Firm — Hedman & Costigan, P.C.; James V. Costigan; Kathleen A. Costigan

(57) ABSTRACT

To provide a rolling bearing having excellent rust prevention capability and capable of being used for a long period of time in a highly corrosion environment. A rolling bearing 1 utilized for a power generator which generates power from natural energy or for generator equipment has one or more bearing members which form the bearing having a rust prevention film formed in a predetermined region of a surface of a base material. The rust prevention film is formed by a porous film with a sacrificial anode action against the base material in the whole of the predetermined region. The porous film in a part or the whole of the predetermined region is subjected to sealing treatment which impregnates the porous film with a sealing treatment agent from a surface of the porous film. A surface of a sealing treatment body obtained from the porous film subjected to the sealing treatment is subjected to first coating treatment which coats the surface of the sealing treatment body with epoxy resin coating. A coated surface formed by the first coating treatment is subjected to a second coating treatment which coats the coated surface with urethane resin coating. The sealing
(Continued)

treatment agent is formed by diluting the epoxy resin coating at a dilution rate of between 15 and 25%.

8 Claims, 7 Drawing Sheets

(51) Int. Cl.
| | |
|---|---|
| *F16C 19/18* | (2006.01) |
| *F16C 19/02* | (2006.01) |
| *C23C 4/08* | (2016.01) |
| *C23C 4/18* | (2006.01) |
| *F03D 80/70* | (2016.01) |
| *F16C 19/06* | (2006.01) |
| *F16C 33/58* | (2006.01) |
| *F16C 19/52* | (2006.01) |

(52) U.S. Cl.
CPC .......... *F16C 19/181* (2013.01); *F16C 19/182* (2013.01); *F16C 33/64* (2013.01); *F03D 80/70* (2016.05); *F05B 2240/50* (2013.01); *F05B 2280/6011* (2013.01); *F16C 19/06* (2013.01); *F16C 19/52* (2013.01); *F16C 33/586* (2013.01); *F16C 2223/30* (2013.01); *F16C 2240/60* (2013.01); *F16C 2300/14* (2013.01); *F16C 2360/31* (2013.01); *Y02E 10/722* (2013.01)

(56) References Cited

FOREIGN PATENT DOCUMENTS

| | | |
|---|---|---|
| JP | 2004-300509 A | 10/2004 |
| JP | 2008-184621 A | 8/2008 |
| JP | 2013-044367 A | 3/2013 |
| KR | 10-2014-0067055 A | 6/2014 |
| WO | 20081078669 A1 | 7/2008 |
| WO | 2013/027597 A1 | 2/2013 |

OTHER PUBLICATIONS

International Search Report for PCT/JP2016/054053 dated May 10, 2016.
English Abstract for JP 2013-044367 A dated Mar. 4, 2013.
English Abstract for CN 103765025 A dated Apr. 30, 2014.
English Abstract for KR 10-2014-0067055 A dated Jun. 3, 2014.
English Abstract for JP 2004-300509 A dated Oct. 28, 2004.
English Abstract for JP 2008-184621 A dated Aug. 14, 2008.

\* cited by examiner

ROLLING BEARING

TECHNICAL FIELD

The present invention relates to a rolling bearing utilized for equipment used in a highly corrosive environment such as outside, on the coast, on the sea. Specifically, the present invention relates to a large-sized rolling bearing utilizable for a wind power generator.

BACKGROUND ART

As a rolling bearing used in a highly corrosive environment such as a rolling bearing for a wind power generator, a rolling bearing provided with an inner ring, an outer ring and a rolling element as bearing members is known. In the rolling bearing, a metal thermal sprayed film with a sacrificial anode action against a base material of the bearing member is formed at a part to be exposed to a corrosive environment in the bearing member, and a part or a whole of pores of the film is sealed (see Patent Document 1). In the rolling bearing, in addition to sealing treatment in which the pore of the film is sealed, in order to improve durability, corrosion resistance and environment shieldability, coating treatment is further applied. In the sealing treatment, an organic sealing treatment agent such as epoxy resin or an inorganic sealing treatment agent having silicate or phosphate as a main component is used.

PRIOR ART DOCUMENT

Patent Document

Patent Document 1: JP 2013-044367 A

SUMMERY OF THE INVENTION

Problems to be Solved by the Invention

Power generation equipment which generates electric power from natural energy such as a wind power generator is usually operated in an unmanned manner from a viewpoint of efficiency or cost, or made to be large so as to be arranged on the coast or at a high place. Thus, it is continuously desired to extend a time until maintenance of a rolling bearing utilized in the power equipment.

The metal thermal sprayed film with the sacrificial anode action in Patent Document 1 is formed to be porous, and rust prevention capability of the metal thermal sprayed film is improved by applying the sealing treatment, however in a case in which the inorganic sealing treatment agent is used, adhesion between the metal thermal sprayed film and a coating film is low, and also in a case in which the organic sealing treatment agent is used, it is desired to improve the adhesion to enhance the rust prevention capability.

An object of the present invention is, in order to solve such a problem, to provide a rolling bearing having high adhesion between a film with a sacrificial anode action formed on a base material of a bearing member and a coating film which covers the film described above, and having excellent rust prevention capability, and capable of being used for a long period of time in a highly corrosive environment.

Means for Solving the Problem

A rolling bearing according to the present invention has one or more bearing members which form the rolling bearing having a rust prevention film formed in a predetermined region of a surface of a base material of the bearing member. The rust prevention coating is formed by a porous film with a sacrificial anode action against the base material, the porous film being formed in the whole of the predetermined region. The porous film in at least a part of the predetermined region is subjected to sealing treatment which impregnates the porous film with a sealing treatment agent from a surface of the porous film, and a surface of a sealing treatment body obtained from the porous film subjected to the sealing treatment is subjected to first coating treatment which coats the surface of the sealing treatment body with epoxy resin coating. The sealing treatment agent is formed by diluting the epoxy resin coating. Further, the rust prevention film is subjected to second coating treatment which coats a coated surface formed by the first coating treatment with urethane resin coating.

The sealing treatment agent is formed by diluting the epoxy resin coating at a dilution rate of 15 to 25%. Here, the dilution rate is defined by 100×(weight of a dilution agent to be blended/weight of the epoxy resin coating to be blended) %.

The base material is formed of iron-based material, and the porous film is formed of material including any element of zinc, aluminum, and magnesium.

The porous coating is provided as a thermal sprayed film formed by the material described above used as a thermal spray material.

A base material of at least one of the bearing members has a bearing fixed surface included in the predetermined region in which the rust prevention film is formed, and the porous film formed on the bearing fixed surface is not subjected to the sealing treatment and the coating treatment. Here, "the porous film is not subjected to the coating treatment" means that the porous film is subjected to neither the first coating treatment nor the second coating treatment.

The rolling bearing is formed to support a blade or a yaw of a wind power generator.

Effects of the Invention

In the present invention, the porous film with the sacrificial anode action formed on the base material of the bearing member is subjected to the sealing treatment which impregnates the porous film with the sealing treatment agent from the surface of the porous film, and then subjected to the first coating treatment which coats with the epoxy resin coating. The sealing treatment agent is formed by diluting the epoxy resin coating used in the first coating treatment, and thereby excellent permeability to a pore of the porous film and high adhesion between the porous film and a coating layer formed by the first coating treatment can be obtained. As a result, the rolling bearing according to the present invention has excellent rust prevention capability and is capable of being used for a long period of time in a highly corrosive environment.

Further, since the dilution rate of the sealing treatment agent used in the sealing treatment for the porous film is set in a range between 15 and 25%, the rust prevention film with especially high rust prevention capability can be obtained.

MODE FOR CARRYING OUT THE INVENTION

Figure 1:
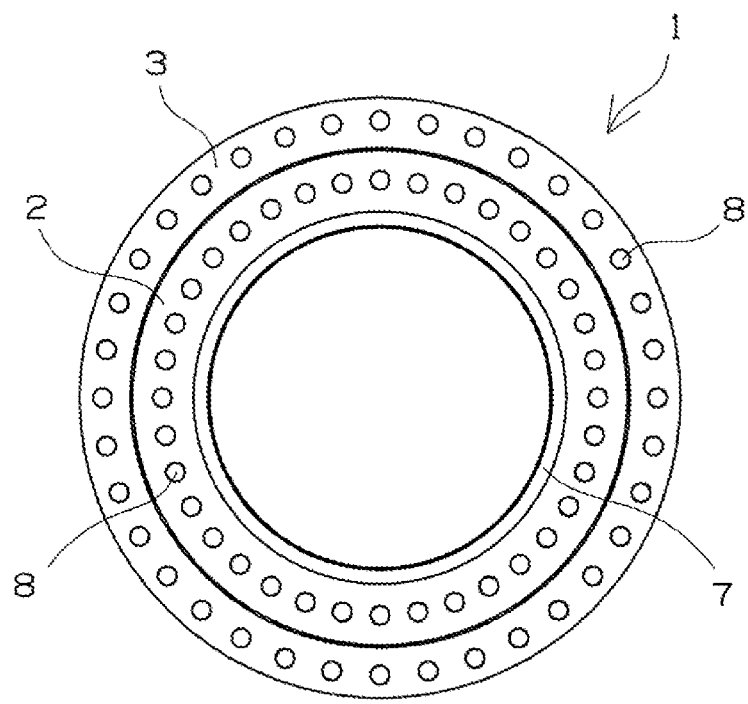
FIG. 1 is a front view and a partially cross-sectional view of a large-sized rolling bearing (inner gear) utilized in a wind power generator according to one embodiment of the present invention.
Figure 1:
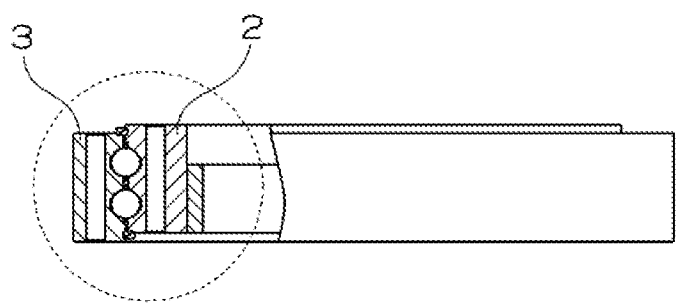

A rolling bearing according to the present invention is mainly formed as a large-sized rolling bearing to which high corrosion resistance is required. Such a bearing is utilized for a power generator which generates electric power from natural energy such as wind power and geothermal heat or for surrounding equipment of the generator. Most of the place where such natural energy can be effectively obtained is a highly corrosive place. For example, in recent years, a place on the land in which an arrangement condition of a windmill of a wind power generator becomes less, and therefore it becomes common that a large-sized windmill of the wind power generator is arranged on the coast or on the sea. Further, power equipment such as a wind power generator which generates electric power from the natural energy is usually operated in an unmanned manner from a viewpoint of efficiency or cost, or made to be large so as to be arranged on the coast or at a high place as described above. Thus, it is desired to achieve long-term maintenance-free of a rolling bearing utilized for power equipment in a highly corrosive environment.

A size of the rolling bearing according to the present invention is not especially limited, and the rolling bearing may be formed in a large size where corrosion resistance treatment using a treatment bath is difficult, and specifically as a rolling bearing provided with an inner ring, an outer ring and a rolling element, a large-sized rolling bearing with an inner diameter of the inner ring set to be 500 mm or more, more specifically 800 mm or more (and less than 6,000 mm) may be adopted. Examples of such a bearing include a main shaft support bearing in a large-sized wind power generator, a blade bearing utilized in a blade pitch swing part, and a yaw bearing utilized in a yaw swing part. The blade bearing is mounted to a proximal end portion of a blade so as to support the blade in a rotatable manner so that an angle of the blade can be adjusted in accordance with wind intensity to receive wind efficiently. Further, the yaw bearing is formed to support a yaw of a nacelle in a rotatable manner in order to adjust a direction of a main shaft in accordance with a wind direction.

The rolling bearing according to the present invention is defined to fulfill three conditions described below.

Condition (1): one or more bearing members which form the rolling bearing have a rust prevention film formed in a predetermined region (hereinafter, referred to as a film forming region) of a surface of a base material.

Condition (2): the rust prevention film has a porous film with a sacrificial anode action against the base material in the whole of the film forming region, and the porous film in at a part of the film forming region or the porous film in the whole of the film forming region is subjected to sealing treatment which impregnates with a sealing treatment agent from a surface of the porous film, and a surface of a sealing treatment body obtained from the porous film subjected to the sealing treatment is subjected to first coating treatment which coats with epoxy resin coating. Further, the rust prevention film is subjected to second coating treatment which coats a coated surface formed by the first coating treatment with urethane resin coating as needed.

Condition (3): the sealing treatment agent is formed by diluting the epoxy resin coating.

According to the condition (2), the rust prevention film according to the present invention is formed as a multilayer film (namely, a film formed of coating films provided by the first and the second coating treatments on the sealing treatment body) in the whole region of the film forming region, or the multilayer film in a part of the film forming region and the porous film, which is not subjected to each treatment, in other region of the film forming region. The multilayer film includes a base layer formed of a sealing treatment body of the porous coating layer, a first coating layer (intermediate coating layer) formed on the base layer by the first coating treatment, and a second coating layer (upper coating layer) formed on the first coating layer by the second coating treatment.

The sealing treatment according to the present invention is formed to impregnate the porous film with the sealing treatment agent from the surface of the porous film by coating the surface of the surface of the porous film with the sealing treatment agent. The sealing treatment agent used in the sealing treatment is formed by diluting epoxy resin coating used in the first coating treatment, and thereby the coating film formed by the first coating treatment and a cured component of the sealing treatment agent in the sealing treatment body can be joined firmly. Accordingly, in the present invention, high adhesion between the porous film and the first coating layer can be obtained.

The film forming region can be set in accordance with a usage condition of the rolling bearing, and the film forming region is set to be at least partially overlapped with a part, which is exposed to a corrosion environment, of the base material of the bearing member. The rust prevention film can prevent corrosion of the film forming part of the base material and a part adjacent thereof by using a sacrificial anode action of the porous film in the rust prevention film.

In a case in which the base material of the bearing member has a bearing fixed surface, it is preferable that the rust prevention film is formed on the bearing fixed surface. Here, the bearing fixed surface denotes a surface to be contacted directly or indirectly with another member such as an axle box to which the rolling bearing is fixed. With the sacrificial anode action of the porous film formed on the bearing fixed surface, corrosion of the film forming part of the base material and a part adjacent thereof can be prevented, and especially, mount accuracy deterioration, fixing force reduction and generation of vibration on the bearing fixed surface due to the corrosion can be prevented. Further, it is preferable that the rust prevention film formed on the bearing fixed surface is formed as a porous film which is not subjected to each treatments described above (namely, the sealing treatment, the first coating treatment, and the second coating treatment). With the porous film, which is not subjected to each treatment described above, formed by means of thermal spray or the like, fastening force can be obtained uniformly in each bolt regardless of shape accuracy when the bearing member is fixed to other member (axle box or the like) by means of fastening of a bolt, and therefore loosening of the bolt due to vibration or occurrence of a stick slip of a fastening part can be prevented. The bearing fixed surface on which the porous film is formed is fastened to other member by means of friction joining. A friction coefficient μ between the bearing fixed surface on which the porous film is formed and the other member is preferably set to be 0.4 or more.

Figure 2:
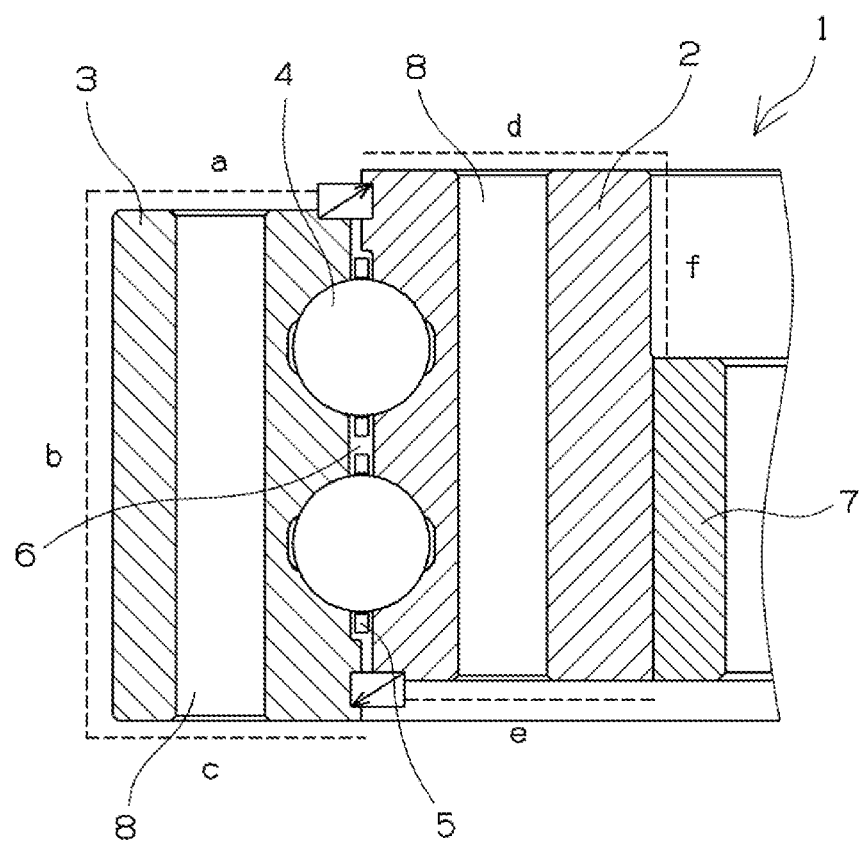
FIG. 2 is a partially enlarged cross-sectional view of FIG. 1.

One embodiment of a rolling bearing according to the present invention is described with reference to FIG. 1 and FIG. 2. FIG. 1 illustrates a front view and a partially cross-sectional view of a large-sized bearing (yaw bearing, blade bearing) for a wind power generator, and FIG. 2 illustrates a partially enlarged cross-sectional view of FIG. 1. As shown in FIG. 1 and FIG. 2, a rolling bearing 1 is provided with an inner ring 2, an outer ring 3, and a plurality of rolling elements 4 as bearing members. The rolling elements are arranged between the inner ring 2 and the outer ring 3 by a multi-row or a single-row and retained by a retainer 5 or a spacer. A grease as a lubricant is sealed in a bearing inner space 6 around the rolling element. The rolling bearing 1 is fastened and fixed to an axle box at a bearing end surface of at least one of the inner ring 2 and the outer ring 3. In a configuration shown in FIG. 1 and FIG. 2, the rolling bearing 1 is fastened to the axle box (not shown) by a bolt via a bolt hole 8 formed in the inner ring 2 and the outer ring 3. Further, in this configuration, a gear 7 is formed on an inner diameter surface of the inner ring 2, however the gear 7 may be formed on an outer diameter surface of the outer ring 3 in accordance with an applied part.

In FIG. 2, a bearing end surface c of the outer ring 3 and a bearing end surface d of the inner ring 2 are formed as a bearing fixed surface fixed to the axle box (not shown). In the rolling bearing 1, the rust prevention film is formed on portions of a through f. Here, each portion of a and c is a bearing end surface of the outer ring 3, a portion of b is an outer diameter surface of the outer ring 3, each portion of d and e is a bearing end surface of the inner ring 2, and a portion of f is an inner diameter surface (except a gear part) of the inner ring 2. In the portions other than the bearing fixed surfaces c, d among the portions of a through f, the rust prevention film is formed as a multilayer film by applying the sealing treatment, the first coating treatment and the second coating treatment to the porous film with the sacrificial anode action against the base material, while in the bearing fixed surfaces c, d, the rust prevention film is formed as the porous film with the sacrificial anode action against the base material, in which each treatment is not applied. Further, a thickness of the film to be formed is extremely thin against a size of the bearing, and therefore an illustration of the film is omitted (a range illustrated by a dashed line corresponds to the film forming region, and this is similar in FIG. 3 and FIG. 4).

The rust prevention film formed on the bearing fixed surfaces c, d is not subjected to the sealing treatment and the first and the second coating treatments after the porous film is formed by means of the metal thermal spray or the like so as to be used in a porous state as it is (namely, the rust prevention film on the bearing fixed surfaces c, d is formed by the porous film as it is). As shown in FIG. 1, fixing to the axle boxy is performed by fastening many bolts, and the rust prevention film on the bearing fixed surface is formed by the porous film as it is and thereby fastening force can be obtained uniformly in each bolt in fastening, and loosening of the bolt due to vibration in use, occurrence of a stick slip of a fastening part, generation of an abnormal noise or the like can be prevented.

Figure 3:
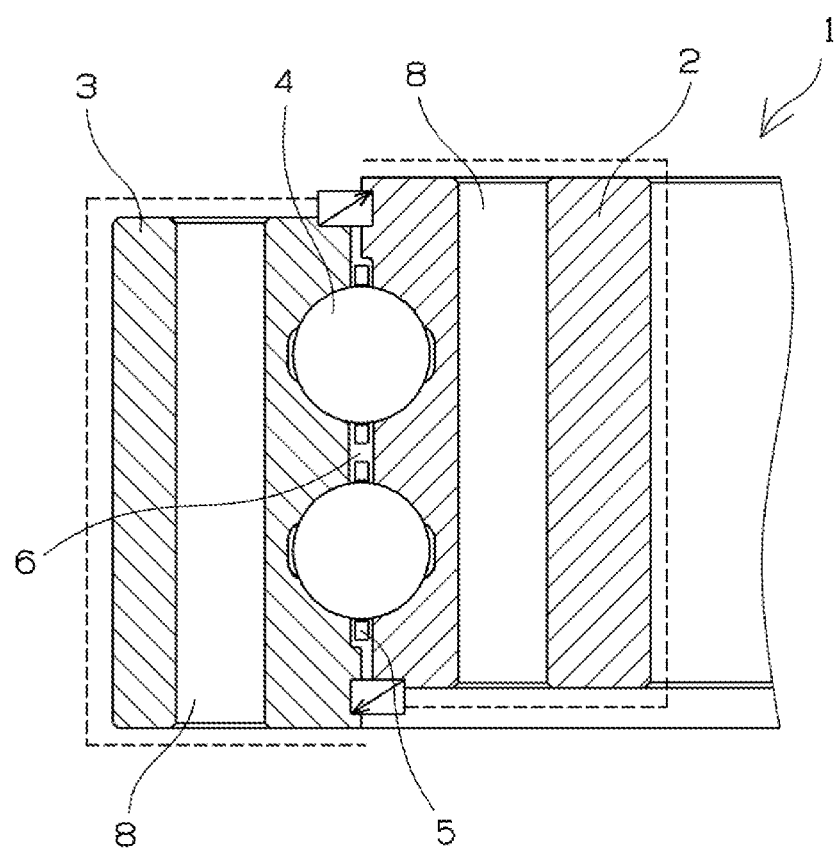
FIG. 3 is a partially enlarged cross-sectional view of a large-sized rolling bearing (without a gear) utilized in a wind power generator according to other embodiment of the present invention.

Other embodiment of the rolling bearing according to the present invention is described with reference to FIG. 3. FIG. 3 illustrates a partially enlarged cross-sectional view of a large-sized bearing (yaw bearing, blade bearing) utilized in a wind power generator. A configuration of a rolling bearing 1 shown in FIG. 3 is similar to that shown in FIG. 1 and FIG. 2 except that the gear 7 is not arranged. In this configuration, since the gear 7 is not arranged, the rust prevention film described above is formed on the whole surface of the inner diameter surface of the inner ring 2 in addition to the parts in the configuration shown in FIG. 1 and FIG. 2.

Figure 4:
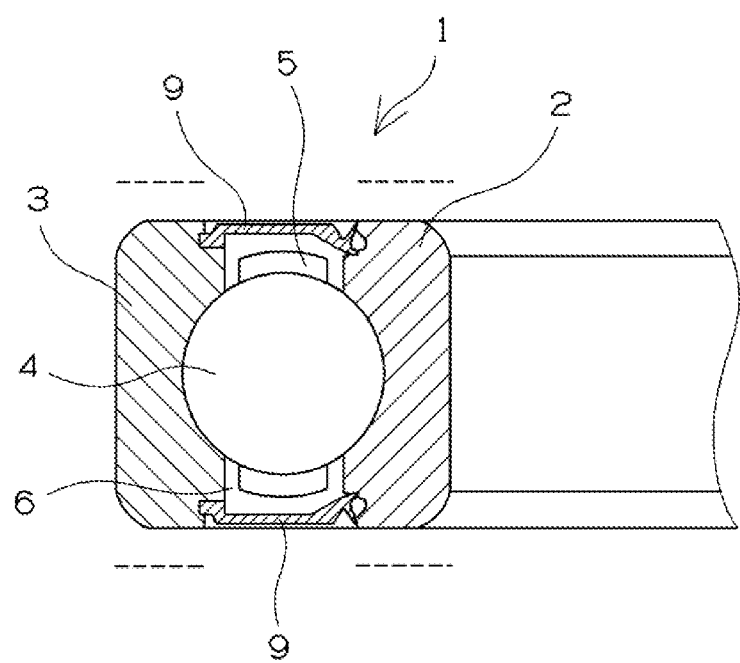
FIG. 4 is a cross-sectional view of a deep groove ball bearing provided with a seal according to other embodiment of the present invention.

Other embodiment of the rolling bearing according to the present invention is described with reference to FIG. 4. FIG. 4 illustrates a cross-sectional view of a deep groove ball bearing provided with a seal. A configuration of a rolling bearing 1 shown in FIG. 4 is provided with a seal member 9 which seals opening parts at both ends in an axial direction of the inner ring 2 and the outer ring 3. The rust prevention film described above is formed on the bearing end surfaces (bearing both width surfaces) of the inner ring 2 and the outer ring 3 to be a sealing surface of the seal member 9. The rolling bearing 1 is used in a state in which an inner diameter of the inner ring and an outer diameter of the outer ring are fitted to other member(s). A part of the bearing end surface also forms the bearing fixed surface. Thus, in the bearing fixed surface, the rust prevention film formed on the bearing end surfaces of the inner ring 2 and the outer ring 3 is formed as the porous film as it is with the sacrificial anode action against the base material, which is not subjected to the sealing treatment and the first and the second coating treatments, and in other region, the rust prevention film is formed as a multilayer film formed by applying the sealing treatment and the first and the second coating treatments to the porous film with the sacrificial anode action against the base material. The film is not formed on an inner ring inner diameter surface and an outer ring outer diameter surface, which form a fitting surface, however the porous film to which each treatment described above is not applied may be formed on the inner ring inner diameter surface and the outer ring outer diameter surface as needed.

With the sacrificial anode action of the porous film in the rust prevention film formed on the bearing end surfaces of the inner ring 2 and the outer ring 3, corrosion of a sealing part including the seal member 9 can be prevented. Thus, deterioration of sealing performance due to the corrosion of the sealing part, leak of the lubricant such as grease in association with the deterioration of the sealing performance, and reduction of a lifetime can be prevented.

The rolling bearing according to the present invention may be used as an automatic aligning roller bearing, an angular ball bearing, a cylindrical roller bearing, a conical roller bearing, a needle roller bearing, a thrust cylindrical roller bearing, a thrust conical roller bearing, a thrust needle roller bearing, or a thrust automatic aligning roller bearing other than the bearing described above as an example.

In the present invention, the base material of the bearing member on which the rust prevention film is formed may be formed of iron-based material (steel material), and examples of the steel material include high carbon chromium bearing steel, carburized steel (case hardening steel), stainless steel, high speed steel, cold rolled steel, and hot rolled steel. Further, any one of the steel materials described above to which high frequency heat treatment, nitriding treatment or the like is applied may be adopted. Among these, the carburized steel (case hardening steel) is preferable for the base material of the bearing member according to the present invention (especially, large sized rolling bearing) because the carburized steel has both of hardness and toughness and further has excellent impact resistance by hardening a certain region from a surface with an appropriate depth and forming a relatively soft core part by means of carburization quenching. Specifically, chromium-molybdenum steel such as SCM445 and SCM440, which is iron-based alloy steel for machine structural use (JIS G4053), or carbon steel for machine structural use (JIS G4051) such as S48C and S50C may be adopted.

The porous film with the sacrificial anode action according to the present invention is formed to be capable of showing the sacrificial anode action based on a relationship with the base material of the bearing member. The film is necessary to contain metal having the ionization tendency higher than that of the base material of the bearing member on which the film is formed, and therefore material and a forming method of the film are not especially limited. Further, the ionization tendency means the order of a standard oxidation reduction potential between a hydrated metal ion and a metal in a water solution. In the case in which the standard oxidation reduction potential is negative, the larger is the absolute value thereof, "the higher is the ionization tendency".

In the case in which the iron-based material described above is used for the base material of the bearing member, material of the film containing elements such as zinc, aluminum, magnesium or the like having a higher ionization tendency than iron is used. The method of forming the film includes coating treatment to be made by using zinc rich paint (zinc rich coating) containing zinc and thermal sprayed film treatment using zinc, aluminum, an alloy or a pseudo alloy formed of aluminum and zinc, an alloy formed of aluminum and magnesium or an alloy formed of aluminum and titanium as a thermal spray material. It is preferable to perform surface roughening of the base material by means of blast treatment as pretreatment for forming the thermal sprayed film in order to ensure adhesion between the thermal sprayed film and the base material.

As a thermal spray method, known thermal spray methods such as a flame spray method, an arc spray method, a plasma spray method, and a laser spray method may be adopted. Among these thermal spray methods, it is preferable to adopt the arc spray method. In the arc spray method, arc is generated between two metal wires to fuse the metal wires. While the metal wires are being fed, droplets of fused metal wires refined by spraying gas to the metal wires are sprayed to the base material of the bearing member to form a film thereon. The material containing zinc, aluminum or magnesium can be adopted as the thermal spray material to easily ensure the adhesion between the base material of the bearing member and the film.

Irrespective of thermal spray methods, a thermal sprayed film is formed as a result of fusion of a large number of particles having different diameters in only the surface layers thereof. Inevitably, openings and gaps are generated at particle boundaries to form a porous film. As the melting point of the thermal spray material becomes lower, the particle becomes smaller in the thermal spraying. As a result, pores of an obtained film (porous film) become smaller. Consequently on the bearing fixed surface, it is difficult to obtain the effect of preventing the fastening portion from loosening and stick slip from occurring. Thus, it is preferable to use aluminum or the alloy consisting of aluminum and magnesium among the thermal spray material, both having a higher melting point than zinc.

The porosity of the thermal sprayed film is set in a range between 3% and 40% and preferably set in a range between 5% and 20%. The porosity is adjustable in accordance with a thermal spray condition or the like. In a case in which the porosity is less than 3%, it is difficult to obtain the effect of preventing the fastening portion from loosening and the stick slip from occurring. On the other hand, in the case in which the porosity exceeds 40%, the corrosion resistance might not be improved sufficiently.

The kind of the thermal spray material described above and the range of the porosity described above are suitable for the bearing fixed surface, however the thermal sprayed film may be formed on other part in the same condition.

The smoother the surface of the porous film with the sacrificial anode action according to the present invention is, the less dirt sticks thereto and therefore high durability of the porous film can be obtained. Thus the surface roughness of the porous film is preferably set to 130 µmRz or less and more preferably set to 100 µmRz or less. Further, from a viewpoint of forming the porous film on the bearing fixed surface, uniformity of film thickness of the film is also required. Accordingly, by setting the mutual error of the film thickness specifically to 100 µm or less, it is possible to prevent backlash from occurring in use, the degree of fixation of the bearing from decreasing, and the porous film from slipping from the axle box due to the stick slip. The mutual error is preferably set to 70 µm or less, and more preferably set to 50 µm or less.

The thickness of the porous film with the sacrificial anode action according to the present invention is not especially limited as long as the required durability can be ensured. For example, the film thickness of the porous film with the sacrificial anode action is preferably set in a range between 10 and 500 µm, more preferably set in a range between 50 and 500 µm, and most preferably set in a range between 100 and 200 µm. Further, the film thickness of the coating film (combination of the first coating layer and the second coating layer) is preferably set in a range between 10 and 500 µm, more preferably set in a range between 50 and 500 µm, and further more preferably set in a range between 100 and 500 µm, and most preferably set in a range between 100 and 200 µm.

As described above, in the present invention, the porous film with the sacrificial anode action is formed on the whole of the film forming region, and the porous film formed on at least a part of the film forming region is subjected to the sealing treatment, and the first and the second coating treatments. The sealing treatment, and the first and the second coating treatments are applied in order to improve the durability, the corrosion resistance and environment shieldability of the porous film.

The sealing treatment agent used in the sealing treatment is formed by diluting the epoxy resin coating used in the first coating treatment with a dilution agent such as an organic solvent. A dilution rate of the sealing treatment agent is defined by using weight of the epoxy resin coating and weight of the dilution agent to be blended in forming the sealing treatment agent as 100=(weight of the dilution agent to be blended/weight of the epoxy resin coating to be blended) %. The dilution rate of the sealing treatment agent is preferably set in a range between 10 and 30%, and more preferably set in a range between 15 and 25%. In a case in which the dilution rate is less than 10%, permeability to a pore of the porous film might be deteriorated, and in a case in which the dilution rate exceeds 30%, the rust prevention capability might be deteriorated.

A method of the sealing treatment is not especially limited as long as the porous film can be impregnated with the sealing treatment agent from the surface of the porous film with the sacrificial anode action formed on the base material. For example, a method of applying the sealing treatment agent on the surface of the porous film may be adopted. The sealing treatment agent entered into the pore of the porous film is hardened, for example, when a three dimensional network structure is formed due to a chemical reaction between an epoxy group-containing component and a hardening agent included in the sealing treatment agent.

The first coating treatment is formed to coat an outer surface of the porous film with the sacrificial anode action, which is subjected to the sealing treatment, with the epoxy resin coating. The second coating treatment is formed to coat an outer surface of a coating layer, which is formed by the first coating treatment, with the urethane resin coating.

Figure 5:
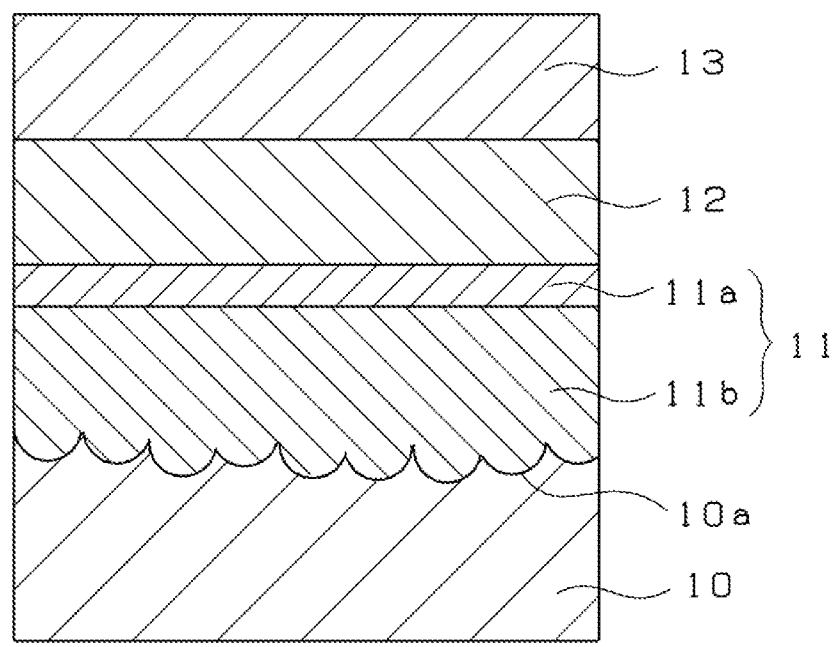
FIG. 5 is a schematic cross-sectional view of a film illustrating one example of a rust prevention film (multilayer film) formed on a base material of a bearing member according to the present invention.

As described above, the rust prevention film according to the present invention is formed as the multilayer film in the whole of the film forming region, or the multilayer film in the film forming region except a part (bearing fixed surface or the like) thereof. The multilayer film includes the base layer formed of the sealing treatment body of the porous film with the sacrificial anode action, the first coating layer (intermediate coating layer) formed on the base layer by the first coating treatment, and the second coating layer (upper coating layer) formed on the first coating layer by the second coating treatment. FIG. 5 is a schematic cross-sectional view illustrating one example of the multilayer film.

The rust prevention film (multilayer film) according to the present invention shown in FIG. 5 is formed on the base material 10 formed of iron-based material, and a base material surface 10a is subjected to blast treatment. A base layer 11 is formed of the sealing treatment body obtained by applying the sealing treatment, which impregnates with the sealing treatment agent from the surface of the porous film, to the porous film after the porous film is formed by thermal spraying aluminum on the base material surface subjected to the blast treatment. A first coating layer 12 is formed on the surface of the sealing treatment body by coating a surface of the sealing treatment body with the epoxy resin coating. A second coating layer 13 is formed on a surface of the first coating layer 12 by coating with the urethane resin coating.

The sealing treatment agent described above is formed by diluting the epoxy resin coating described above. A sealing treatment layer 11a is formed in the base layer 11 at a side of the first coating layer in a certain region of the porous film impregnated with the sealing treatment agent, and a remaining region of the base layer 11 is formed as an aluminum thermal sprayed layer 11b in which the pores are not sealed.

In the rolling bearing according to the present invention, the grease sealed as a lubricant is not especially limited as long as it is normally used for a rolling motion. Examples of the base oil which forms the grease include mineral oil such as paraffin-based mineral oil and naphthene-based mineral oil; hydrocarbon-based synthetic oil such as polybutene oil, poly-α-olefin oil, alkylbenzene oil, and alkylnaphthalene oil; and non-hydrocarbon-based synthetic oil such as natural fat and oil, polyol ester oil, phosphate ester oil, diester oil, polyglycol oil, silicone oil, polyphenyl ether oil, alkyldiphenyl ether oil, and fluorinated oil. These base oils may be used singly or in combination of not less than two kinds.

The kinematic viscosity (40° C.) of the base oil to be used in the present invention is preferably set in a range between 30 and 600 mm$^2$/s. Especially, the kinematic viscosity of the base oil to be used for the large-sized bearing of the wind power generator is preferably set in a range between 300 and 600 mm$^2$/s. When a wind power is low, the large-sized bearing of the wind power generator may be rotated at an extremely low rotation speed. As a result, the oil film on a rolling contact surface becomes relatively thin and unstable. Thus, in the case in which the kinematic viscosity of the base oil at 40° C. is less than 300 mm$^2$/s, oil shortage might occur. On the other hand, in the case in which the kinematic viscosity at 40° C. exceeds 600 mm$^2$/s, the performance of supplying the lubricant to the rolling contact surface is inferior. Consequently fretting (fretting corrosion) is apt to occur. The rolling bearing which supports the blade of the wind power generator or the yaw is rotated not continuously, but when an angle of the blade or the nacelle is adjusted in conformity to the wind direction. Thus, as the base oil for the rolling bearing, the kinematic viscosity (40° C.) of approximately 50 mm$^2$/s may be adopted.

Further, examples of thickener which forms the grease include metal soap-based thickener such as aluminum soap, lithium soap, sodium soap, lithium complex soap, calcium complex soap, and aluminum complex soap; urea-based compound such as diurea compound and polyurea compound; and fluororesin powder such as PTFE resin. These thickeners may be used singly or in combination of not less than two kinds.

Further, a known additive can be added to the grease as needed. Examples of the additive include an extreme pressure agent such as organozinc compound and organomolybdenum compound; an antioxidant such as amine-based compound, phenol-based compound, and sulfur-based compounds; a wear inhibitor such as sulfur-based compound and phosphorous-based compound; a rust prevention agent such as polyhydric alcohol ester; a viscosity index improver such as polymethacrylate and polystyrene; a solid lubricant such as molybdenum disulfide and graphite; and an oily agent such as ester and alcohol.

It is preferable to set the worked penetration (JIS K 2220) of a grease composition in a range between 200 and 350. In the case in which the worked penetration is less than 200, the degree of oil separation at a low temperature is low and therefore defective lubrication occurs, and thereby fretting (fretting corrosion) is apt to occur in the case of the large-sized bearing of the wind power generator. On the other hand, in the case in which the worked penetration exceeds 350, grease is soft to be apt to flow out of the bearing easily.

In the rolling bearing according to the present invention formed as the bearing provided with a seal in which the grease is sealed, since deterioration of the sealing performance due to corrosion of the sealing part can be prevented when the rolling bearing is used in a highly corrosive environment, leaking of the grease might not occur, and therefore desired grease can be selected from the greased described above in accordance with demanded properties.

Examples

A comparative test of the rust prevention capability was executed against test pieces according to examples 1 to 5 in which the dilution rates of the sealing treatment agents used for forming the rust prevention film are different from each other. Each test piece is formed of material of SS400 and has a size of 80 mm×20 mm×t3 mm. The thermal spray film was formed on the whole surface of the base material of each test piece by using aluminum thermal spray material by means of arc spray method, and the sealing treatment was applied to the surface of each test piece by using the sealing treatment agent with the dilution rate different in each example. The sealing treatment agent used in the sealing treatment is formed by diluting the epoxy resin coating to be used in the first coating treatment. The dilution rates of the examples 1 to 5 are set to be 10%, 20%, 40%, 60%, and 80%, respectively. The test pieces of the examples 1 to 5 was formed in the same condition except that the dilution rates were different from each other.

Figure 6:
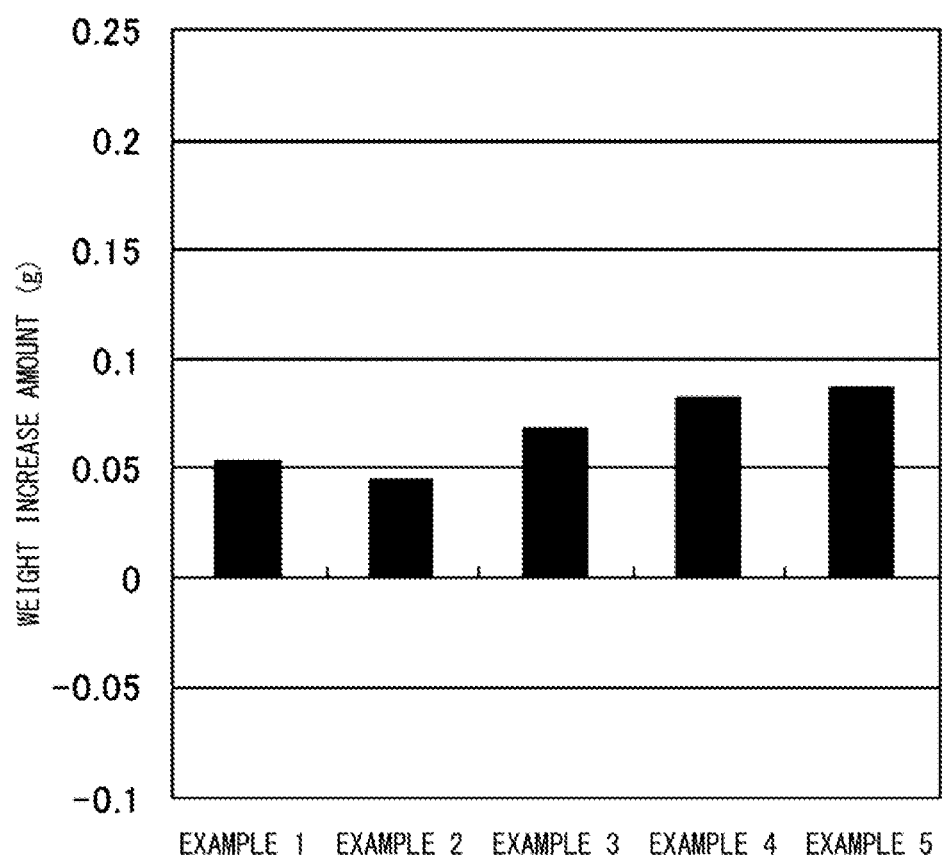
FIG. 6 is a graph illustrating a result of a comparative test for rust prevention capability of examples according to the present invention.
Figure 7:
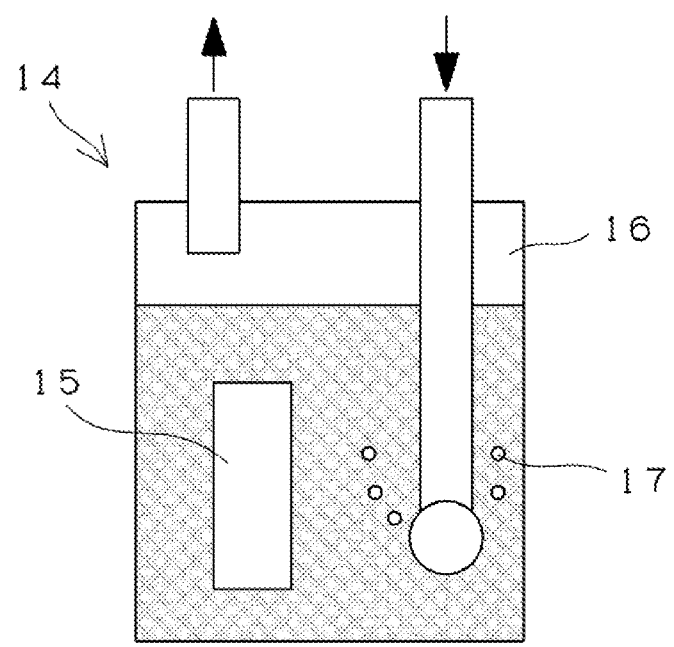
FIG. 7 is a schematic view of the comparative test for the rust prevention capability.

By using a test tank 14 shown in FIG. 7, the formed each test piece 15 was immersed in 3.5 wt. % sodium chloride aqueous solution in an oxygen saturated state at 30° C. saturated by means of air bubbling in the test tank. In FIG. 7, a reference sign 16 denotes a silicon rubber plug, and a reference sign 17 denotes air, and a black arrow in the figure denotes a flow of the air. An immersing period was set to one month, and weight of the test piece was measured before the immersion and after the immersing period has passed, and the change of the weight was calculated. FIG. 6 is a diagram illustrating a result corresponding to a weight change amount of the test piece of each example.

As shown in FIG. 6, in the example 2 in which the dilution rate of the sealing treatment agent is set to 20%, a weight increase amount is the smallest, and the weight increase amount becomes larger when the dilution rate is set to be larger or smaller than 20%. Thus, it is found that the film with high rust prevention capability can be obtained when the dilution rate of the sealing treatment agent is set to approximately 20%.

INDUSTRIAL APPLICABILITY

The rolling bearing according to the present invention has excellent corrosion resistance and can be utilized as a large-sized bearing utilized in a high humidity environment, an environment in which a dew condensation is apt to occur, or a highly corrosion environment such as on the coast and on the sea. For example, the rolling bearing according to the present invention is suitably used as a bearing which supports a blade or a yaw of a wind power generator.

REFERENCE SIGNS LIST

1: rolling bearing
2: inner ring
3: outer ring
4: rolling element
5: retainer
6: bearing inner space
7: gear
8: bolt hole
9: seal member
10: base material
10a: base material surface
11: base layer
11a: sealing treatment layer
11b: aluminum thermal sprayed layer
12: first coating layer
13: second coating layer
14: test tank
15: test piece
16: silicon rubber plug
17: air

The invention claimed is:

1. A rolling bearing comprising one or more bearing members, which form the rolling bearing, having a rust prevention film formed in a predetermined region of a surface of a base material of the bearing member,
wherein:
the rust prevention film is formed by a porous film with a sacrificial anode action against the base material, the porous film being formed in the whole of the predetermined region;
the porous film in at least a part of the predetermined region is subjected to sealing treatment which impregnates the porous film with a sealing treatment agent from a surface of the porous film, and a surface of a sealing treatment body obtained from the porous film subjected to the sealing treatment is subjected to first coating treatment which coats the surface of the sealing treatment body with epoxy resin coating; and
the sealing treatment agent is formed by diluting the epoxy resin coating.

2. The rolling bearing according to claim 1, wherein the rust prevention film is subjected to second coating treatment which coats a coated surface formed by the first coating treatment with urethane resin coating.

3. The rolling bearing according to claim 1, wherein the sealing treatment agent is formed by diluting the epoxy resin coating at a dilution rate of between 15 and 25%.

4. The rolling bearing according to claim 3, wherein a surface portion of the sealing treatment body is a layer in which holes are sealed with the sealing treatment agent, and a remaining portion of the sealing treatment body is a layer in which holes are not sealed.

5. The rolling bearing according to claim 1, wherein the base material is formed of iron-based material, and the porous film is formed of material including any element of zinc, aluminum, and magnesium.

6. The rolling bearing according to claim 5, wherein the porous film is provided as a thermal sprayed film formed by the material used as a thermal spray material.

7. The rolling bearing according to claim 1, wherein a base material of at least one of the bearing members has a bearing fixed surface included in the predetermined region in which the rust prevention film is formed, and
the porous film formed on the bearing fixed surface is not subjected to the sealing treatment and the coating treatment.

8. The rolling bearing according to claim 1, wherein the rolling bearing is formed to support a blade or a yaw of a wind power generator.

* * * * *